United States Patent
Uda

(10) Patent No.: US 8,474,790 B2
(45) Date of Patent: Jul. 2, 2013

(54) VALVE DRIVE APPARATUS IN WHICH A SHAFT IS DRIVEN THROUGH A SPEED REDUCING MECHANISM TO ROTATE A VALVE

(75) Inventor: Toshiaki Uda, Miyoshi (JP)

(73) Assignee: Denso Corporation, Kariya (JP)

( * ) Notice: Subject to any disclaimer, the term of this patent is extended or adjusted under 35 U.S.C. 154(b) by 177 days.

(21) Appl. No.: 13/160,832

(22) Filed: Jun. 15, 2011

(65) Prior Publication Data

US 2011/0303860 A1  Dec. 15, 2011

(30) Foreign Application Priority Data

Jun. 15, 2010  (JP) ................................ 2010-136104

(51) Int. Cl.
*F16K 31/04* (2006.01)
(52) U.S. Cl.
USPC .................... 251/129.12; 251/250.5; 251/368
(58) Field of Classification Search
USPC ............... 251/129.11–129.13, 305–308, 368, 251/248, 250.5; 123/337
See application file for complete search history.

(56) References Cited

U.S. PATENT DOCUMENTS

| | | | | |
|---|---|---|---|---|
| 5,517,966 A | * | 5/1996 | Kanazawa et al. | 251/129.11 |
| 5,876,014 A | * | 3/1999 | Noritake et al. | 251/129.12 |
| 5,970,997 A | * | 10/1999 | Hudson et al. | 251/129.11 |
| 6,267,352 B1 | * | 7/2001 | Semeyn et al. | 251/129.12 |
| 6,283,150 B2 | * | 9/2001 | Apel et al. | 251/248 |
| 6,435,169 B1 | * | 8/2002 | Vogt | 251/129.11 |
| 6,729,299 B2 | * | 5/2004 | Anschicks et al. | 251/129.11 |
| 6,877,716 B2 | * | 4/2005 | Noritake | 251/129.12 |
| 7,207,545 B2 | * | 4/2007 | Kawai et al. | 251/305 |
| 2005/0183705 A1 | * | 8/2005 | Nanba et al. | 251/129.11 |
| 2009/0078898 A1 | * | 3/2009 | Sasaki et al. | 251/129.11 |

FOREIGN PATENT DOCUMENTS

| | | |
|---|---|---|
| JP | 63-208643 | 8/1988 |
| JP | P2005-016461 A | 1/2005 |
| JP | P2006-312945 A | 11/2006 |
| JP | P2009-036108 A | 2/2009 |
| JP | 2009-150252 | 7/2009 |

* cited by examiner

Primary Examiner — John Bastianelli
(74) Attorney, Agent, or Firm — Nixon & Vanderhye PC

(57) ABSTRACT

A final gear of a speed reducing mechanism and a magnet of a valve opening degree sensor are separately joined to a shaft, which is rotated integrally with a valve. The final gear and the magnet are arranged to satisfy at least one of $\theta a > \Theta - \theta swo$ and $\theta b > \theta swc$, where $\theta a$ denotes a valve open side clearance that is a circumferential gap angle circumferentially measured between the magnet and an open side end part of the final gear, $\theta b$ denotes a valve close side clearance that is a circumferential gap angle, which is circumferentially measured between the magnet and a close side end part of the final gear, $\Theta$ denotes a full open degree of the valve, $\theta swo$ denotes a valve open sensing degree, and $\theta swc$ denotes a valve close sensing degree.

6 Claims, 8 Drawing Sheets

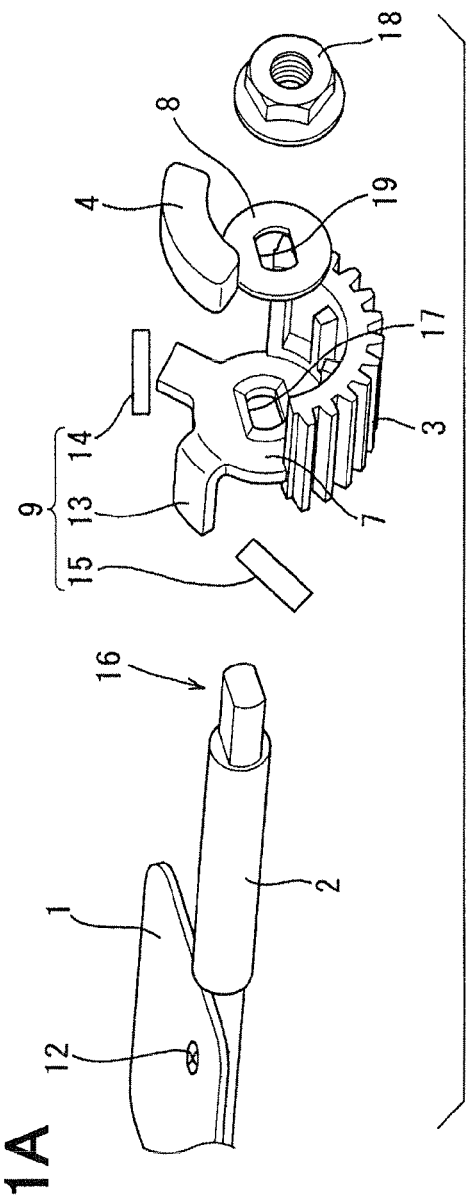
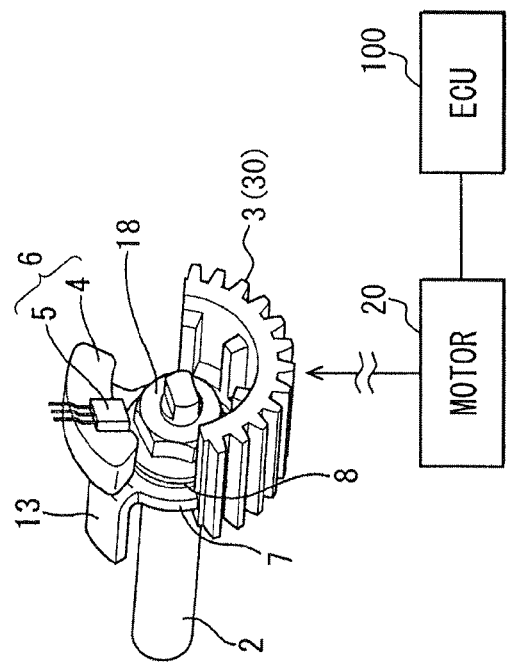
FIG. 1A
FIG. 1B

VALVE OPENING DEGREE = MAGNET ANGLE

SENSOR OUTPUT i  FULL CLOSE ii  FULL OPEN i ii iii iv v vi

VALVE DRIVE APPARATUS IN WHICH A SHAFT IS DRIVEN THROUGH A SPEED REDUCING MECHANISM TO ROTATE A VALVE

CROSS REFERENCE TO RELATED APPLICATION

This application is based on and incorporates herein by reference Japanese Patent Application No. 2010-136104 filed on Jun. 15, 2010.

BACKGROUND OF THE INVENTION

1. Field of the Invention

The present invention relates to a valve drive apparatus, in which a shaft is driven through a speed reducing mechanism to rotate a valve integrally with the shaft.

2. Description of Related Art

Japanese Unexamined Patent Publication No. 2009-150252A teaches a valve drive apparatus, which drives a shaft through a final gear of a speed reducing mechanism to rotate a valve fixed to the shaft.

The valve drive apparatus of Japanese Unexamined Patent Publication No. 2009-150252A will be described with reference to FIGS. 10A and 10B.

The valve drive apparatus of Japanese Unexamined Patent Publication No. 2009-150252A includes the shaft 102, the final gear 103 of the speed reducing mechanism and a valve opening degree sensor 106. The shaft 102 is rotated integrally with the valve. The speed reducing mechanism increases a rotational torque of the electric motor. The valve opening degree sensor 106 senses an opening degree of the valve (shaft 102) and includes a magnet 104 and a magnetic sensing device 105.

The final gear 103 is joined to the shaft 102 through a final gear support portion 107, which is formed integrally with the final gear 103, and an output of the speed reducing mechanism is conducted to the shaft 102.

In the valve opening degree sensor 106 of Japanese Unexamined Patent Publication No. 2009-150252A, the magnet 104 is installed to the final gear support portion 107, and the magnetic sensing device 105 is installed to a housing 111 (stationary member).

When the final gear 103 is rotated, a distance and a positional relationship between the magnet 104 and the magnetic sensing device 105 are changed. Thereby, as shown in FIG. 10B, the valve opening degree sensor 106 outputs a signal of low (Lo) corresponding to an OFF state or a signal of high (Hi) corresponding to an ON state. That is, the valve drive apparatus of Japanese Unexamined Patent Publication No. 2009-150252A senses the open/close state of the valve with the valve opening degree sensor 106 of a switch type.

The connection between the shaft 102 and the final gear support portion 107 receives an output torque of the electric motor, which is amplified with the speed reducing mechanism, and also a force, which is applied to the valve and is conducted to the connection through the shaft 102.

In this way, the strong rotational torque is applied to the connection between the shaft 102 and the final gear support portion 107.

When the connection between the shaft 102 and the final gear support portion 107 is damaged by any possibility (thereby enabling free rotation of the shaft 102 relative to the final gear support portion 107), it is required to sense the damage (failure) at the connection between the shaft 102 and the final gear support portion 107.

However, in the prior art technique described above, the magnet 104 is installed to the final gear support portion 107, so that even in the state where the connection between the shaft 102 and the final gear support portion 107 is damaged, the sensed result of the valve opening degree sensor 106 with respect to the rotation of the final gear 103 becomes normal.

That is, in the prior art technique, the damage of the connection between the shaft 102 and the final gear support portion 107 cannot be sensed based on the sensed result of the valve opening degree sensor 106.

As discussed above, the valve opening degree sensor 106 of Japanese Unexamined Patent Publication No. 2009-150252A is of the switch type, and thereby the sensed result of the valve opening degree sensor 106 becomes the low (Lo) in both of a full close position and a full open position of the valve, in which the magnet 104 is placed distant from the magnetic sensing device 105, as indicated in FIG. 10B.

That is, the valve opening degree sensor 106 of Japanese Unexamined Patent Publication No. 2009-150252A provides the same sensed result, i.e., the low (Lo) in both of the full close position and the full open position of the valve.

Thus, the sensed result of the valve opening degree sensor 106 becomes normal even in a case where the valve is placed in the full close position despite of a fact that the valve is supposed to be in the full open position or in a case where the valve is placed in the full open position despite of a fact that the valve is supposed to be in the full close position. Such an incident occurs in, for example, a case where a wiring error of the electric motor (e.g., a case where a cathode and an anode are erroneously reversely connected in the electric motor) occurs to cause rotation of the valve by the electric motor to an opposite side, which is opposite from a demanded side, or in a case where the valve is rotated to an opposite opening degree, which is opposite from a demanded opening degree, by an external force.

That is, according to the prior art technique, even when the open/close state of the valve is reversed from its demanded state, such a problem cannot be sensed based on the sensed result of the valve opening degree sensor 106.

SUMMARY OF THE INVENTION

The present invention is made in view of the above disadvantage. According to the present invention, there is provided a valve drive apparatus, which includes a valve, a shaft, an electric motor, a speed reducing mechanism, means for limiting a rotational range of the final gear (hereinafter, simply referred to as "limiting means"), a valve opening degree sensor, and means for determining a failure of the valve (hereinafter, simply referred to as "determining means"). The shaft is adapted to rotate integrally with the valve. The electric motor is rotated upon energization of the electric motor to generate a rotational torque applied to the shaft. The speed reducing mechanism is adapted to reduce a speed of rotation outputted from the electric motor and to output the rotation of the reduced speed to the shaft. The speed reducing mechanism includes a final gear, which is fixed to the shaft through a final gear support portion and applies the rotational torque to the shaft. The limiting means is for limiting the rotational range of the final gear between a full open position and a full close position. The valve opening degree sensor senses a valve opening degree of the valve and includes a magnet and a magnetic sensing device. The magnet is fixed to the shaft to rotate integrally with the shaft. The magnetic sensing device is fixed to a stationary member and senses a change in a magnetic flux supplied from the magnet. The sensed result of the valve opening degree sensor, which is sensed with the magnetic sensing device, is changeable between high and low. The valve opening degree sensor senses a change in the valve opening degree of the valve from a valve close side to a valve open side only at a valve open sensing degree, which is between a full close degree and a full open degree of the valve and is passed at time of rotating the valve from the full close degree to the full open degree, upon occurrence of a corresponding change in the sensed result of the valve opening degree sensor, which is one of a change from the low to the high and a change from the high to the low. The valve opening degree sensor senses a change in the valve opening degree of the valve from the valve open side to the valve close side only at a valve close sensing degree, which is between the full open degree and the full close degree and is passed at time of rotating the valve from the full open degree to the full close degree upon occurrence of a corresponding change in the sensed result of the valve opening degree sensor, which is the other one of the change from the low to the high and the change from the high to the low. The determining means is for determining a failure of the valve in a case where a change in an open/close state of the valve is not sensed with the valve opening degree sensor at time of driving the final gear from the valve close side to the valve open side or from the valve open side to the valve close side. The final gear and the magnet are separately joined to the shaft. A positional relationship between the final gear and the magnet is set such that the final gear and the magnet contact with each other in a rotational direction when the final gear is rotated in a state where a connection between the shaft and the final gear support portion is damaged. The final gear and the magnet are arranged to satisfy at least one of $\theta a > \Theta - \theta swo$ and $\theta b > \theta swc$, where $\theta a$ denotes a valve open side clearance that is a circumferential gap angle circumferentially measured between the magnet and an open side end part of the final gear, which is an end part of the final gear in a valve opening direction; $\theta p$ denotes a valve close side clearance that is a circumferential gap angle circumferentially measured between the magnet and a close side end part of the final gear, which is an end part of the final gear in a valve closing direction; $\Theta$ denotes the full open degree; $\theta swo$ denotes the valve open sensing degree; and $\theta swc$ denotes the valve close sensing degree.

According to the present invention, there is also provided a valve drive apparatus, which includes a valve, a shaft, an electric motor, a speed reducing mechanism, a valve opening degree sensor, and means for determining a failure of the valve (hereinafter, simply referred to as "determining means"). The shaft is adapted to rotate integrally with the valve. The electric motor is rotated upon energization of the electric motor to generate a rotational torque applied to the shaft. The speed reducing mechanism is adapted to reduce a speed of rotation outputted from the electric motor and to output the rotation of the reduced speed to the shaft. The speed reducing mechanism includes a final gear, which is fixed to the shaft through a final gear support portion and applies the rotational torque to the shaft. The valve opening degree sensor senses a valve opening degree of the valve and includes a magnet and a magnetic sensing device. The magnet is fixed to the shaft to rotate integrally with the shaft. The magnetic sensing device is fixed to a stationary member and senses a change in a magnetic flux supplied from the magnet. A sensed result of the valve opening degree sensor, which is sensed with the magnetic sensing device, is changeable between high and low. The valve opening degree sensor senses a change in the valve opening degree of the valve from a valve close side to a valve open side only at a valve open sensing degree, which is between a full close degree and a full open degree of the valve and is passed at time of rotating the valve from the full close degree to the full open degree, upon occurrence of a corresponding change in the sensed result of the valve opening degree sensor, which is one of a change from the low to the high and a change from the high to the low. The valve opening degree sensor senses a change in the valve opening degree of the valve from the valve open side to the valve close side only at a valve close sensing degree, which is between the full open degree and the full close degree and is passed at time of rotating the valve from the full open degree to the full close degree upon occurrence of a corresponding change in the sensed result of the valve opening degree sensor, which is the other one of the change from the low to the high and the change from the high to the low. The determining means is for determining a failure of the valve in a case where a change in an open/close state of the valve is not sensed with the valve opening degree sensor at time of driving the final gear from the valve close side to the valve open side or from the valve open side to the valve close side. The final gear and the magnet are separately joined to the shaft. A positional relationship between the final gear and the magnet is set such that the final gear and the magnet do not contact with each other in a rotational direction when the final gear is rotated in a state where a connection between the shaft and the final gear support portion is damaged.

BRIEF DESCRIPTION OF THE DRAWINGS

The invention, together with additional objectives, features and advantages thereof, will be best understood from the following description, the appended claims and the accompanying drawings in which:

FIG. 1A is an exploded perspective view showing disassembled components of a valve drive apparatus according a first embodiment of the present invention;

FIG. 1B is a perspective view showing an assembled state of the components shown in FIG. 1A;

Figure 2A:
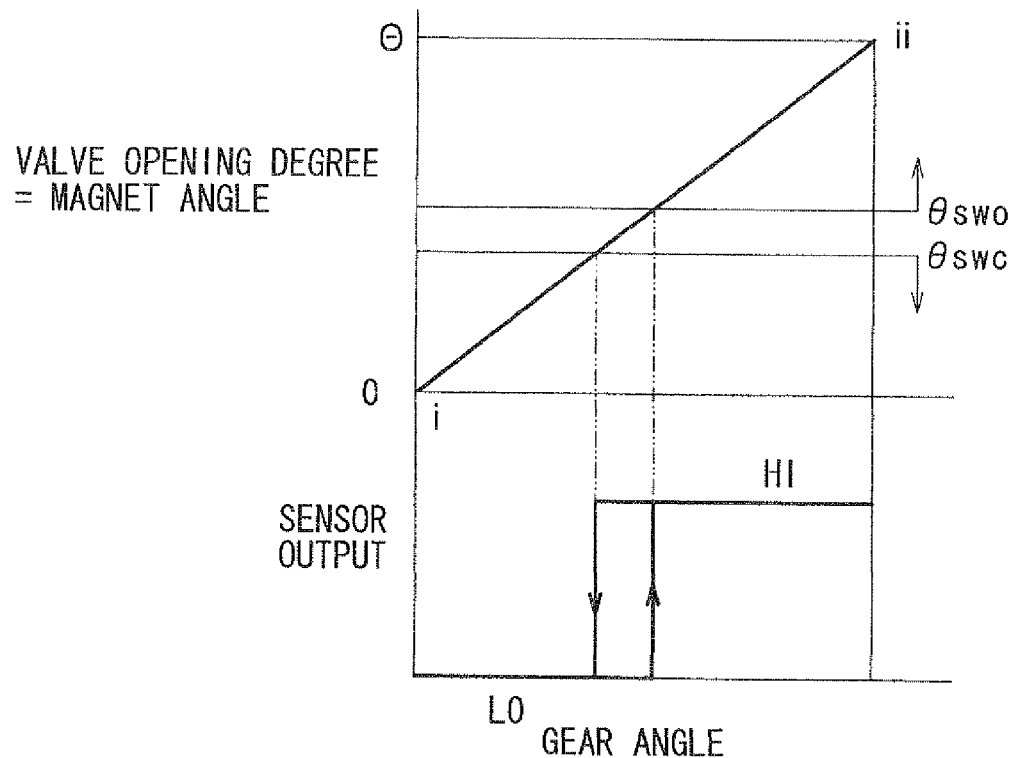
FIG. 2A is a diagram showing a valve opening degree (magnet angle) and a sensor output relative to an angle of a final gear according to the first embodiment.

DETAILED DESCRIPTION OF THE INVENTION (First Aspect)

A first aspect of the present invention will be described with reference to FIGS. 1A to 6.

A valve drive apparatus of the present aspect includes a shaft 2, an electric motor 20, a speed reducing mechanism 30, a permanent magnet 4 and a valve opening degree sensor 6. A valve 1 is fixed to the shaft 2 with screws 12 to rotate integrally with the shaft 2. The electric motor 20 generates a rotational torque upon energization thereof. The speed reducing mechanism 30 reduces a speed (rotational speed) of rotation, which is outputted from the electric motor 20, and conducts the rotation of the reduced speed to the shaft 2. The speed reducing mechanism 30 has a plurality of gears. Among these gears of the speed reducing mechanism 30, only a final gear 3, which applies the rotational torque to the shaft 2, is depicted in the drawings. The magnet 4 is rotated integrally with the shaft 2. The valve opening degree sensor 6 has a Hall IC (magnetic sensing device) 5, which is fixed to a stationary member and senses a change in a magnetic flux outputted from the magnet 4.

The valve opening degree sensor 6 is of a switch type. Specifically, an output of the valve opening degree sensor 6 changes between high (Hi) and low (Lo).

The valve opening degree sensor 6 senses a change from a valve close side to a valve open side of the valve 1 by sensing a change in the output from the low to the high (or from the high to the low) only at a valve open sensing degree θswo, which is passed at the time of changing the valve opening degree of the valve 1 from the full close degree 0 to the full open degree Θ. The valve opening degree sensor 6 also senses a change from the valve open side to the valve close side of the valve 1 by sensing a change in the output from the high to the low (or from the low to the high) only at a valve close sensing degree θswc, which is passed at the time of changing the valve opening degree of the valve 1 from the full open degree Θ to the full close degree 0.

That is, the different sensing results are obtained at the full close degree 0 and the full open degree Θ, respectively.

The final gear 3 is provided with a final gear support portion 7, through which the final gear 3 is installed to the shaft 2, and this final gear support portion 7 is joined to the shaft 2.

The magnet 4 is provided with a magnet support portion 8, through which the magnet 4 is installed to the shaft 2, and this magnet support portion 8 is joined to the shaft 2.

The final gear support portion 7 and the magnet support portion 8 are independently joined to, i.e., fixed to the shaft 2. In this way, the final gear 3 and the magnet 4 are independently joined to, i.e., fixed to the shaft 2.

The valve drive apparatus includes a limiting arrangement (limiting means) 9, which limits a full open position and a full close position of the final gear 3 to limit a rotational range of the final gear 3.

A positional relationship between the final gear 3 and the magnet 4 is set as follows. That is, in a damaged state, in which a connection (joint) between the shaft 2 and the final gear support portion 7 is damaged, when the final gear 3 is rotated, the final gear 3 and the magnet 4 contact with each other in a rotational direction of the final gear 3.

Figure 3:
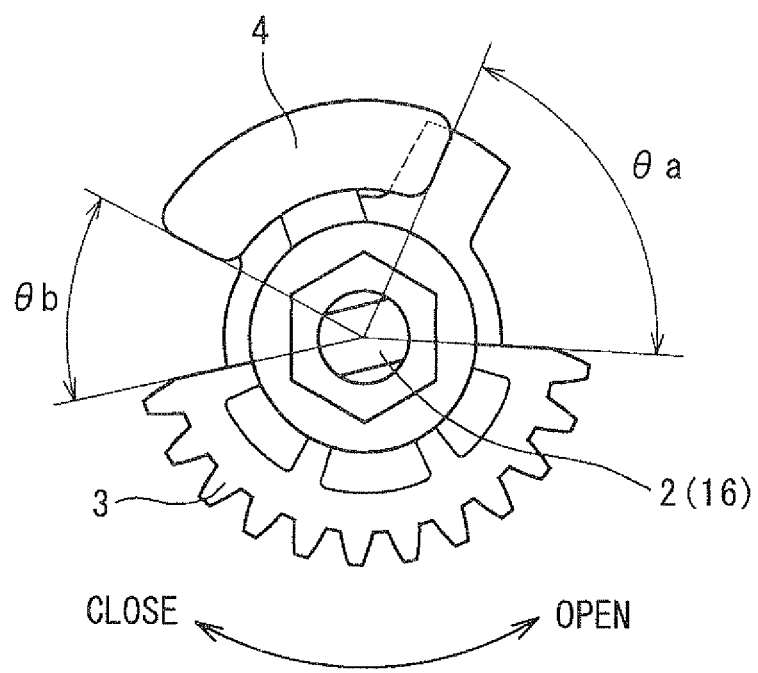
FIG. 3 is an axial view showing a positional relationship between the final gear and the magnet in a state where a connection between a shaft and a final gear support portion is not damaged according to the first embodiment.

With reference to FIG. 3, in an axial view of the shaft 2, a circumferential gap angle (or simply referred to as a gap angle) measured in the rotational direction (circumferential direction) between an open side end part of the final gear 3, which is an end part of the final gear 3 in a valve opening direction (counterclockwise direction in FIG. 3), and the magnet 4 is denoted as a valve open side clearance θa. Also, a circumferential gap angle measured in the rotational direction (circumferential direction) between a close side end part of the final gear 3, which is an end part of the final gear 3 in a valve closing direction (clockwise direction in FIG. 3), and the magnet 4 is denoted as a valve close side clearance θb. In the present aspect, the full open degree Θ, the valve open sensing degree θswo, the valve close sensing degree θswc, the valve open side clearance θa and the valve close side clearance θb satisfy at least one of a relationship of θa>Θ-θswo and a relationship of θb>θswc.

The valve drive apparatus is provided with an engine control unit (ECU) 100, which serves as a control device. The ECU 100 has a failure determining function (serving as a failure determining means), which is implemented by a control program stored in a memory of the ECU 100. Instead of using the control program to implement the failure determining function, the failure determining function may be implemented by hardware (e.g., a logic circuit) in the ECU 100. As the failure determining function of the ECU 100, the ECU 100 determines occurrence of a failure of the valve 1 in a case where a change in the open/close state of the valve 1 cannot be sensed even when the final gear 3 is driven from the valve close side to the valve open side or is driven from the valve open side to the valve close side.

Furthermore, the ECU 100 determines the occurrence of the failure of the valve 1 when the sensed result of the valve opening degree sensor 6 indicates the valve open state in a case where the valve 1 is supposed to be in a valve close position. Also, the ECU 100 determines the occurrence of the failure of the valve 1 when the sensed result of the valve opening degree sensor 6 indicates the valve close state in a case where the valve 1 is supposed to be in a valve open position.

(Second Aspect)

A second aspect of the present invention will be described with reference to FIGS. 1A-1B, 2A-2C, 8 and 9.

Similar to the first aspect, a valve drive apparatus according to a second aspect of the present invention includes the shaft 2, the electric motor 20, the speed reducing mechanism 30, the permanent magnet 4 and the valve opening degree sensor 6. The valve 1 is fixed to the shaft 2 to rotate integrally with the shaft 2. The electric motor 20 generates a rotational torque upon energization thereof. The speed reducing mechanism 30 reduces a speed (rotational speed) of rotation, which is outputted from the electric motor 20, and conducts the rotation of the reduced speed to the shaft 2. The speed reducing mechanism 30 has a plurality of gears. Among these gears of the speed reducing mechanism 30, only the final gear 3, which applies a rotational torque to the shaft 2, is depicted in the drawings. The magnet 4 is rotated integrally with the shaft 2.

The valve opening degree sensor 6 has the Hall IC (magnetic sensing device) 5, which is fixed to the stationary member and senses a change in a magnetic flux outputted from the magnet 4.

The valve opening degree sensor 6 is of the switch type. Specifically, an output of the valve opening degree sensor 6 changes between high (Hi) and low (Lo).

The valve opening degree sensor 6 senses a change from a valve close side to a valve open side of the valve 1 by sensing a change in the output from the low to the high (or from the high to the low) only at a valve open sensing degree θswo, which is passed at the time of changing the valve opening degree of the valve 1 from the full close degree 0 to the full open degree Θ. The valve opening degree sensor 6 also senses a change from the valve open side to the valve close side of the valve 1 by sensing a change in the output from the high to the low (or from the low to the high) only at a valve close sensing degree θswc, which is passed at the time of changing the valve opening degree of the valve 1 from the full open degree Θ to the full close degree 0.

That is, the different sensing results are obtained at the full close degree 0 and the full open degree Θ, respectively.

The final gear 3 includes the final gear support portion 7, through which the final gear 3 is installed to the shaft 2, and this final gear support portion 7 is joined to the shaft 2.

The magnet 4 is provided with the magnet support portion 8, through which the magnet 4 is installed to the shaft 2, and this magnet support portion 8 is joined to the shaft 2.

The final gear support portion 7 and the magnet support portion 8 are independently joined to the shaft 2. In this way, the final gear 3 and the magnet 4 are independently joined to the shaft 2.

A diameter (or a radial extent) of the final gear 3 may be different from that of the magnet 4. Alternatively, an axial location of the final gear 3 may be different from that of the magnet 4. That is, the positional relationship between the final gear 3 and the magnet 4 is set such that the final gear 3 and the magnet 4 do not contact with each other in the rotational direction even when the final gear 3 is rotated in the state where the connection (joint) between the shaft 2 and the final gear support portion 7 is damaged.

The valve drive apparatus is provided with the electronic control unit (ECU) 100, which serves as a control device. The ECU 100 has a failure determining function (serving as a determining means), which is implemented by a control program stored in the memory of the ECU 100. Instead of using the control program to implement the failure determining function, the failure determining function may be implemented by a hardware (e.g., a logic circuit) in the ECU 100. As the failure determining function of the ECU 100, the ECU 100 determines occurrence of a failure of the valve 1 in a case where a change in the open/close state of the valve 1 cannot be sensed even when the final gear 3 is driven from the valve close side to the valve open side or is driven from the valve open side to the valve close side.

Furthermore, the ECU 100 determines the occurrence of the failure of the valve 1 when the sensed result of the valve opening degree sensor 6 indicates the valve open state in a case where the valve 1 is supposed to be in a valve close position. Also, the ECU 100 determines the occurrence of the failure of the valve 1 when the sensed result of the valve opening degree sensor 6 indicates the valve close state in a case where the valve 1 is supposed to be in a valve open position.

First Embodiment

Next, a first embodiment of the present invention, which is implemented in a tumble control valve (TCV), will be described with reference to FIGS. 1A to 5. In the following embodiments, the components, which are the same as or similar to those discussed in the first and/or second aspects of the present invention, will be indicated by the same reference numerals.

The TCV is an apparatus, which controls a flow of intake air to be supplied into a cylinder of an internal combustion engine to generate a tumble flow (vertical vortex) in a combustion chamber. The valve (valve element) 1, which generates a localized flow of the intake air, is placed in an intake passage (specifically, an intake port formed in a cylinder head or a downstream side part of an intake manifold connected to the intake port). The valve 1 is opened or closed in response to an operational state of the engine to generate the tumble flow in the combustion chamber.

The valve 1 is a planar member (plate member), which can be shifted between a full close state and a full open state. In the full close state of the valve 1, the valve 1 is closed such that only a small portion (e.g., an upper portion) of the intake passage, in which the valve 1 is placed, is opened. In the full open state of the valve 1, the intake passage, in which the valve 1 is placed, is fully opened. The valve 1 is fixed to a side surface of the shaft 2 (specifically, a planar installation surface of the shaft 2, which is designed to accommodate the valve 1) with fixing members (e.g., screws) 12. The shaft 2 is configured into a rod form and is rotatably supported by the stationary member (e.g., a housing 11) through a bearing.

Here, the valve 1 shown in FIG. 1A has a generally rectangular shape. This is due to the following reason. That is, a cross section of the intake passage, in which the valve 1 is placed, has a generally rectangular shape. In order to implement the full close state of the valve 1 discussed above, the shape of the valve 1 is selected to generally coincide with the shape of the cross section of the intake passage. The shape of the portion of the intake passage, in which the valve 1 is placed, and the shape of the valve 1 discussed above are mere examples and may be modified in an appropriate manner depending on a need.

The TCV includes the valve drive apparatus to open or close the valve 1 through the shaft 2.

Besides the valve 1 and the shaft 2 discussed above, the valve drive apparatus includes the electric motor 20, the speed reducing mechanism 30, the permanent magnet 4 and the valve opening degree sensor 6. The electric motor 20 generates the rotational torque upon energization thereof. The speed reducing mechanism 30 reduces the speed (rotational speed) of rotation, which is outputted from the electric motor 20, and conducts the rotation of the reduced speed to the shaft 2. The speed reducing mechanism 30 has the multiple gears. Among these gears of the speed reducing mechanism 30, only the final gear 3, which applies the rotational torque to the shaft 2, is depicted in the drawings. The magnet 4 is rotated integrally with the shaft 2. The valve opening degree sensor 6 senses the open/close state of the valve 1 (shaft 2) and has the Hall IC 5 (an example of the magnetic sensing device). The Hall IC is provided to a cover (an example of the stationary member), which closes an opening of the housing 11 that receives the speed reducing mechanism. The Hall IC 5 senses a change in the magnetic flux outputted from the magnet 4. The energization of the electric motor 20 is controlled by the engine control unit (ECU) 100, which serves as the control device.

The electric motor 20 is, for example, a direct current (DC) electric motor, which changes its rotational direction in response to a change in a flow direction of the electric current supplied to the electric motor 20. However, the electric motor 20 is not limited to the DC motor and may be changed to any suitable electric motor depending on a need.

The speed reducing mechanism 30 conducts the output torque (rotational torque) of the electric motor 20 to the shaft 2 upon amplifying the output torque through the gears. The final gear 3 of the speed reducing mechanism 30 is joined to the end part of the shaft 2 through the final gear support portion 7 (the gear plate), which is integrated with the final gear 3.

The final gear 3 of the present embodiment is made of a resin material and is molded in a predetermined die.

The final gear support portion 7 is made of a metal material, which is formed through a press working process of a metal plate (e.g., iron plate).

A stop lever 13 is provided in an outer peripheral part of the final gear support portion 7 to limit the full open position and the full close position of the final gear 3.

The limiting arrangement (limiting means) 9, which includes the stop lever 13, will now be described.

In the TCV of the present embodiment, the limiting arrangement (limiting means) 9 is provided to limit the full open position and the full close position.

Besides the stop lever 13 discussed above, the limiting arrangement (limiting means) 9 further includes two stoppers (specifically, a full close side stopper 14 and a full open side stopper 15), which are provided in the housing 11.

Figure 2B:
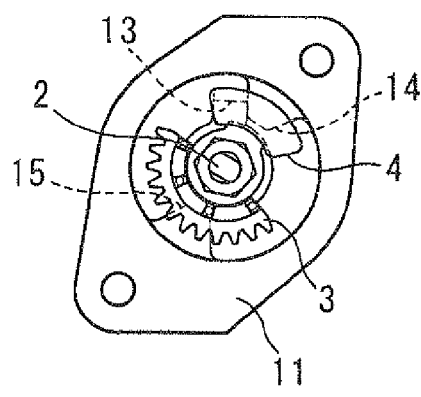
FIG. 2B is an axial view showing the components of the valve drive apparatus in a full close position indicated with a reference numeral i.
Figure 2C:
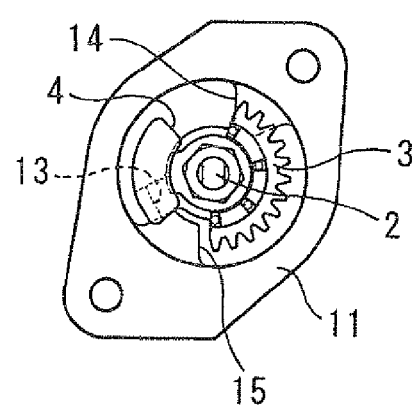
FIG. 2C is an axial view showing the components of the valve drive apparatus in a full open position indicated with a reference numeral ii.

As shown in FIGS. 2B and 2C, the full close side stopper 14 and the full open side stopper 15 are formed in the housing 11, which receives the final gear 3. As shown in FIG. 2B, the stop lever 13 contacts the full close side stopper 14 at the full close position to limit further rotation of the final gear 3 in the valve closing direction (clockwise direction). Furthermore, as shown in FIG. 2C, the stop lever 13 contacts the full open side stopper 15 at the full open position to limit further rotation of the final gear 3 in the valve opening direction (counterclockwise direction).

As discussed above, the limiting arrangement (limiting means) 9 limits the full open position and the full close position of the final gear 3.

A gear mold part (a part of the final gear support portion 7), which is insert-molded in the final gear 3, is provided in the outer peripheral part of the final gear support portion 7 at a location, which is different from the location of the stop lever 13. When the gear mold part of the final gear support portion 7 is insert-molded in the final gear 3 made of the resin material, the final gear 3 and the final gear support portion 7 are integrated together.

Next, the joint between the shaft 2 and the final gear support portion 7 will be described. The final gear 3 and the magnet 4 are independently joined to the shaft 2. The joint between the magnet 4 and the shaft 2 will be described later.

As shown in FIG. 1A, a double-sided portion 16 (i.e., a portion having two planar surfaces, which are opposed to each other in a direction perpendicular to a plane of each of the planar surfaces) at the end part of the shaft 2.

A gear fitting hole 17 is formed in a center part (a part where the rotational axis is located) of the final gear support portion 7. The gear fitting hole 17 has two parallel sides, which coincide with the two planar surfaces, respectively, of the double-sided portion 16.

The double-sided portion 16 of the shaft 2 is fitted into the gear fitting hole 17 of the final gear support portion 7, so that the shaft 2 and the final gear support portion 7 (the final gear 3) are joined together to rotate together. A nut 18, which maintains the joined state of the shaft 2 and the final gear support portion 7, will be described later.

Next, the valve opening degree sensor 6 will be described.

The valve opening degree sensor 6 senses the opening degree of the valve 1 in a contactless manner by using the magnet 4 and the Hall IC 5. The valve opening degree sensor 6 is of the switch type. That is, the sensed result of the valve opening degree sensor 6, which is obtained in response to the change in the opening degree of the valve 1, is changed between a valve close sensing state and a valve open sensing state.

A specific example of the magnet 4 will now be described. The magnet 4 of the present embodiment is a resin magnet (one type of permanent magnet), which is formed by magnetizing a resin member that includes magnetic powder (e.g., ferrite power). The magnet 4 is magnetized such that two poles (an N-pole and an S-pole) are opposed to each other in the axial direction of the shaft 2. Specifically, the S-pole of the magnet 4 is directed toward the cover, to which the Hall IC 5 is installed.

The Hall IC 5 includes a Hall element, an amplifier and a comparator. The Hall element generates an output depending on an increase or decrease in a density of a magnetic flux, which is directed in a predetermined direction. The amplifier amplifies the output of the Hall element. The comparator outputs the high (high signal) when a value of voltage (or electric current), which is amplified with the amplifier, exceeds a threshold value. In the present embodiment, the Hall IC 5 outputs the high (ON) in the state where the magnetic flux of the S-pole is applied from the side where the magnet 4 is placed. Furthermore, the Hall IC outputs the low (OFF) in the state where the magnetic flux of the S-pole is not applied from the side where the magnet 4 is placed.

The Hall IC 5 is installed to the cover such that the Hall IC 5 is opposed to the magnet 4 while a predetermined gap is defined between the magnet 4 and the Hall IC 5 in the axial direction when the valve 1 (shaft 2) is placed in the valve open side.

The comparator may be provided separately from the Hall IC 5, if desired.

As shown in FIG. 2A, the valve opening degree sensor 6 senses the change from the valve close side to the valve open side of the valve 1 (i.e., the change from the low to the high) only at the valve open sensing degree θswo, which is passed at the time of changing the valve opening degree of the valve 1 from the full close degree 0 to the full open degree Θ. The valve opening degree sensor 6 also senses the change from the valve open side to the valve close side of the valve 1 (i.e., the change from the high to the low) only at the valve close sensing degree θswc, which is passed at the time of changing the valve opening degree of the valve 1 from the full open degree Θ to the full close degree 0.

That is, the valve opening degree sensor 6 outputs the low (Lo) in the valve close side of the valve 1 and outputs the high (Hi) in the valve open side of the valve 1, so that the different sensing results are obtained at the full close degree 0 and the full open degree Θ, respectively, of the valve 1.

Next, the installation of the magnet 4 will be described.

The magnet 4 is joined to the end part of the shaft 2 through the magnet support portion 8 (magnet plate), which is integrated with the magnet 4.

The magnet 4 of the present embodiment is made of the resin material as discussed above and is molded into a fan shape (sector shape) in the predetermined die.

The magnet support portion 8 is made of a metal material. Specifically, the magnet support portion 8 is formed through a press working process of a metal plate (e.g., iron plate).

A magnet mold part (a part of the magnet support portion 8), which is insert-molded in the magnet 4 made of the resin material, is provided in an outer peripheral part of the magnet support portion 8. When the magnet mold part of the magnet support portion 8 is molded in the magnet 4 made of the resin material, the magnet 4 and the magnet support portion 8 are integrated together.

Next, the assembling of the magnet 4 and the shaft 2 (specifically the magnet support portion 8 and the shaft 2) will be described.

As discussed above, the double-sided portion 16 is formed in the end part of the shaft 2.

Furthermore, a magnet fitting hole 19 is formed in a center part (a part where the rotational axis is located) of the magnet support portion 8. The magnet fitting hole 19 has two parallel sides, which coincide with the two planar surfaces, respectively, of the double-sided portion 16.

The double-sided portion 16 of the shaft 2 is fitted into the magnet fitting hole 19 of the magnet support portion 8, so that the shaft 2 and the magnet support portion 8 (the magnet 4) are joined together to rotate together.

A male thread is formed in two arcuate outer peripheral surface sections of the double-sided portion 16 of the shaft 2, which connect the two planar surfaces of the double-sided portion 16 together. Then, the final gear support portion 7 and the magnet support portion 8 are fitted to the double-sided portion 16 of the shaft 2, and thereafter the nut 18 is threadably tightened against the male thread of the double-sided portion 16 of the shaft 2. In this way, as shown in FIG. 1B, the joined state of the shaft 2 and the final gear support portion 7 is maintained, and the joined state of the shaft 2 and the magnet support portion 8 is maintained.

The output torque of the electric motor 20, which is amplified with the speed reducing mechanism 30, is applied to the connection between the shaft 2 and the final gear support portion 7.

Furthermore, the force (e.g., the intake air flow, the intake air pulsation, the backfire) is applied to the connection between the shaft 2 and the final gear support portion 7 through the shaft 2.

Specifically, the strong rotational torque is applied from both of the input side and the output side to the connection between the shaft 2 and the final gear support portion 7.

As discussed above, the strong rotational torque is applied to the connection between the shaft 2 and the final gear support portion 7, so that the connection between the shaft 2 and the final gear support portion 7 may possibly be damaged by, for example, the long term use.

In contrast, the strong rotational torque is not applied to the connection between the shaft 2 and the magnet support portion 8. Therefore, a possibility of damage at the connection between the shaft 2 and the magnet support portion 8 is very low even after the long term use.

In the TCV of the present embodiment, as discussed above the final gear 3 and the magnet 4 are independently joined to the shaft 2 for the purpose of sensing the damage (failure) at the connection between the shaft 2 and the final gear support portion 7 in the case where the connection between the shaft 2 and the final gear support portion 7 is damaged.

Furthermore, in the TCV of the present embodiment, the following technique is adapted to sense the damage (failure) at the connection between the shaft 2 and the final gear support portion 7 in the case where the connection between the shaft 2 and the final gear support portion 7 is damaged.

In the present embodiment, in order to reduce the size of the TCV by eliminating the wasteful space, the final gear 3 and the magnet 4 are arranged such that the diameter of the final gear 3, which is measured from the rotational center, and the diameter of the magnet 4, which is measured from the rotational center, are generally identical to each other, and the axial location of the final gear 3 and the axial location of the magnet 4 are generally identical to each other.

Therefore, in the TCV of the present embodiment, even when the final gear 3 is driven in the state where the connection between the shaft 2 and the final gear support portion 7 is damaged, the final gear 3 and the magnet 4 can contact with each other in the rotational direction of the shaft 2.

The final gear 3 and the magnet 4 satisfy the following positional relationship. Specifically, with reference to FIG. 3, in the axial view of the shaft 2, the circumferential gap angle measured in the rotational direction (circumferential direction) between the open side end part of the final gear 3, which is the end part of the final gear 3 in the valve opening direction (counterclockwise direction in FIG. 3), and the magnet 4 is denoted as the valve open side clearance $\theta a$. Also, the circumferential gap angle measured in the rotational direction (circumferential direction) between the close side end part of the final gear 3, which is the end part of the final gear 3 in the valve closing direction (clockwise direction in FIG. 3), and the magnet 4 is denoted as the valve close side clearance $\theta b$. In the present embodiment, the full open degree $\Theta$, the valve open sensing degree $\theta swo$, the valve close sensing degree $\theta swc$, the valve open side clearance $\theta a$ and the valve close side clearance $\theta b$ satisfy the relationship of $\theta a > \Theta - \theta swo$.

The ECU 100, which controls the power supply of the electric motor 20, will now be described.

The ECU 100 is an electronic control device of a known type that includes a microcomputer having a memory (storage device), which stores various programs, and a central processing unit (CPU), which executes various computations.

The ECU 100 has a program (hereinafter referred to as a TCV control program), which controls the open/close state of the valve 1 based on the operational state of the engine. The exemplary control operation (one example) of the TCV control program will now be described.

The ECU 100 controls the electric power supply of the electric motor 20 to rotate the valve 1 in a direction against the flow direction of the intake air, so that the full close state of the valve 1 is achieved in an operational state, in which generation of the tumble flow is required, such as an operational state, in which the engine is still cold, or an operational state, in which a demanded intake air quantity of the engine is relatively small.

In this way, the localized flow (windage) is generated in the portion of the intake passage, at which the valve 1 is placed, and thereby there is achieved the operational state, in which the strong tumble flow is generated in the cylinder.

The ECU 100 controls the electric power supply of the electric motor 20 to rotate the valve 1 in a direction to coincide with the flow direction of the intake air, so that the full open state of the valve 1 is achieved in an operational state, in which the generation of the tumble flow is not required, such as an operational state, in which the engine is warmed up, or an operational state, in which the demanded intake air quantity of the engine is relatively large.

In this way, the partially closed state of the portion of the intake passage, at which the valve 1 is placed, no longer exists, and thereby there is achieved the operational state, in which the tumble flow is not generated in the cylinder.

In the above description, there is described the case, in which the valve 1 is adapted to be driven in both of the valve opening direction and the valve closing direction through the control operation of the electric motor 20. Alternatively, a return spring may be used to return the valve 1 to the full close position (initial position) at the time of stopping the power supply to the electric motor 20.

Furthermore, the TCV control program includes a failure determining program (serving as a failure determining means) to sense a failure of the TCV.

The failure determining program (failure determining means) determines the occurrence of the failure of the valve 1 in a state where the valve opening degree sensor 6 does not sense a change in the open/close state of the valve 1 even when the final gear 3 is driven from the valve close side to the valve open side, or when the final gear 3 is driven from the valve open side to the valve close side. Furthermore, as the exemplary case where the failure of the valve 1 is determined, the occurrence of the failure of the TCV is notified visually to the occupant of the vehicle through a warning light (not shown).

Figure 4A:
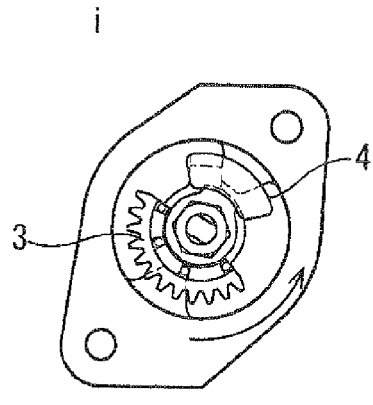
FIGS. 4A to 4F are axial views showing various operational positions in an operational state where the final gear is driven in a state where the connection between the shaft and the final gear support portion is damaged according to the first embodiment.
Figure 4B:
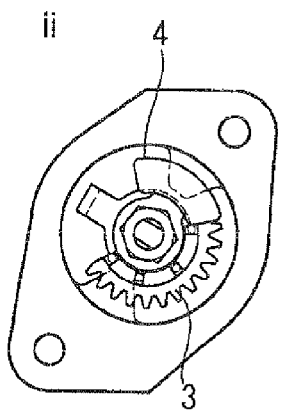

This failure determination will be described with reference to FIGS. 4A to 5.

FIGS. 4A to 4F show various exemplary operational positions, which are indicated with reference numerals i to vi, respectively, in FIGS. 4A to 4F. Furthermore, points indicated with the reference numerals i to vi in FIG. 5 correspond to the positions indicated with the reference numerals i to vi in FIGS. 4A to 4F. In the position (full close position) indicated with the reference numeral i in FIG. 4A, the sensed result of the valve opening degree sensor 6 is the low (Lo), as indicated with the reference numeral i in FIG. 5. Now, it is assumed that the connection between the shaft 2 and the final gear support portion 7 is damaged, and the final gear 3 is driven in the valve opening direction (counterclockwise direction in FIG. 4A) from the position (full close position) indicated with the reference numeral i in FIG. 4A. When the final gear 3 is further rotated in the valve opening direction, the final gear 3 contacts the magnet 4 in the position indicated with the reference numeral ii in FIG. 4B, i.e., an intermediate position between the full close position and the full open position, and the final gear 3 begins to urge and rotate the magnet 4 in the valve opening direction. At this time, the sensed result of the valve opening degree sensor 6 is the low (Lo), as indicated with the reference numeral ii in FIG. 5.

Figure 4C:
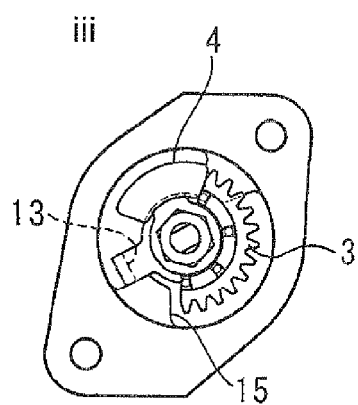
Figure 4D:
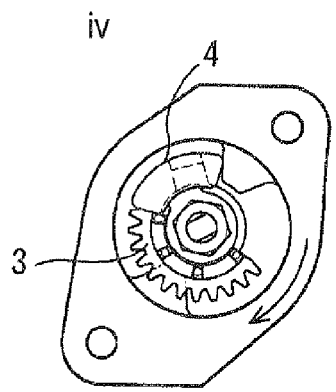

Then, when the final gear 3 reaches the position (full open position) indicated with the reference numeral iii in FIG. 4C, the stop lever 13 of the final gear support portion 7 hits the full open side stopper 15, and thereby the rotation of the final gear 3 is stopped at the full open position. At this time, the magnet 4 is overlapped with the Hall IC 5 in the axial direction, and the sensed result of the valve opening degree sensor 6 is the high (Hi), as indicated with the reference numeral iii in FIG. 5.

Now, it is assumed that the final gear 3 is driven from the position (full open position) indicated with the reference numeral iii in FIG. 4C in the valve closing direction (clockwise direction). As discussed above, in the position (full open position) indicated with the reference numeral iii in FIG. 4C, the sensed result of the valve opening degree sensor 6 is the high (Hi), as indicated with the reference numeral iii in FIG. 5. Then, when the final gear 3 is further rotated in the valve closing direction (clockwise direction), the final gear 3 contacts the magnet 4 in the position indicated with the reference numeral iv in FIG. 4D, i.e., an intermediate position between the full close position and the full open position, and the final gear 3 begins to urge and rotate the magnet 4 in the valve closing direction. At this time, the magnet 4 is kept overlapped with the Hall IC 5 in the axial direction, and the sensed result of the valve opening degree sensor 6 is the high (Hi), as indicated with the reference numeral iv in FIG. 5.

Figure 4E:
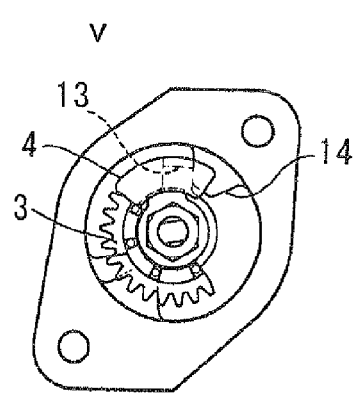
Figure 4F:
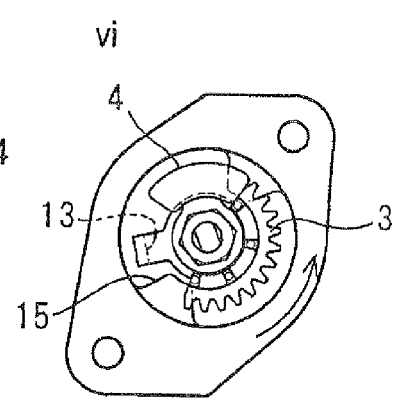

Then, when the final gear 3 reaches the position (full close position) indicated with the reference numeral v in FIG. 4E, the stop lever 13 of the final gear support portion 7 hits the full close side stopper 14, and thereby the rotation of the final gear 3 is stopped at the full close position. At this time, the magnet 4 is kept overlapped with the Hall IC 5 in the axial direction, and the sensed result of the valve opening degree sensor 6 is the high (Hi), as indicated with the reference numeral v in FIG. 5.

Now, it is assumed that the final gear 3 is driven from the position indicated with the reference numeral v in FIG. 4E, i.e., the full close position in the valve opening direction (counterclockwise direction in FIG. 4E). Then, when the final gear 3 is further rotated in the valve opening direction, the final gear 3 contacts the magnet 4 in the position indicated with the reference numeral vi in FIG. 4F, i.e., an intermediate position between the full open position and the full close position, and the final gear 3 begins to urge and rotate the magnet 4 in the valve opening direction.

Figure 5:
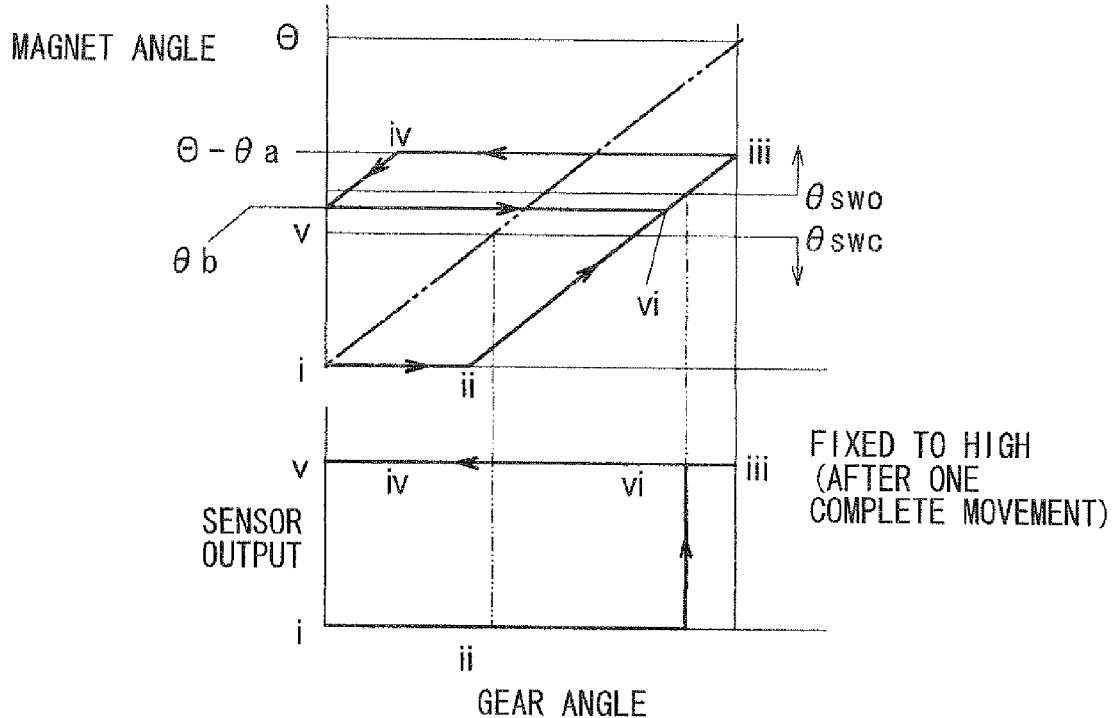
FIG. 5 is a diagram showing a magnet angle and a sensor output relative to an angle of the final gear in the state where the connection between the shaft and the final gear support portion is damaged according to the first embodiment.

Thereafter, the stop lever 13 of the final gear support portion 7 hits the full open side stopper 15, and thereby the rotation of the final gear 3 is stopped at the full open position (see the position indicated with the reference numeral iii in FIG. 4C and the sensed result at the point indicated with the reference numeral iii in FIG. 5).

Now, a first advantage of the first embodiment will be described. As discussed above, the TCV of the first embodiment is constructed to satisfy the relationship of $\theta a > \Theta - \theta swo$. Therefore, in the case where the connection between the shaft 2 and the final gear support portion 7 is damaged, once the output of the valve opening degree sensor 6 becomes the high (Hi), it is possible to limit the change from the high (Hi) to the low (Lo).

Therefore, the ECU 100 (the program implementing the function of the failure determining means) determines the occurrence of the failure of the valve 1 in the case where the change in the open/close state of the valve 1 cannot be sensed even when the final gear 3 is repeatedly driven between the full close position and the full open position.

Specifically, the TCV of the first embodiment can sense the damage of the connection between the shaft 2 and the final gear support portion 7, which cannot be sensed with the prior art technique.

Now, a second advantage of the first embodiment will be described. As discussed above, the valve opening degree sensor 6 outputs the low (Lo) in the valve close side of the valve 1 and outputs the high (Hi) in the valve open side of the valve 1, so that the different sensing results are obtained at the full close degree 0 and the full open degree $\Theta$, respectively, of the valve 1.

The ECU 100 (the program implementing the function of the failure determining means) determines the occurrence of the failure of the valve 1 when the sensed result of the valve opening degree sensor 6 indicates the valve open state in the case where the valve 1 is supposed to be in the valve close position. Also, the ECU 100 determines the occurrence of the failure of the valve 1 when the sensed result of the valve opening degree sensor 6 indicates the valve close state in the case where the valve 1 is supposed to be in the valve open position.

Specifically, the ECU 100 determines the problem of the discrepancy between the sensed result of the valve opening degree sensor 6 and the actual open/close state of the valve 1 in the case where the output of the valve opening degree sensor 6 is the high (Hi) when the output of the valve opening degree sensor 6 is supposed to be the low (Lo) in view of the drive state (energization state) of the electric motor 20 or in the case where the output of the valve opening degree sensor 6 is the low (Lo) when the output of the valve opening degree sensor 6 is supposed to be the high (Hi) in view of the drive state (energization state) of the electric motor 20.

Therefore, the ECU 100 (the program implementing the function of the failure determining means) can sense the problem of the discrepancy between the sensed result of the valve opening degree sensor 6 and the actual open/close state of the valve 1 in the case where the electric motor 20 drivers the valve 1 in the opposite direction, which is opposite from the demanded direction, due to, for example, a wiring error of the electric motor 20 (e.g., a case where a cathode and an anode are erroneously reversely connected in the electric motor 20) or in the case where the valve 1 is driven to an opposite opening degree, which is opposite from the demanded opening degree, due to, for example, application of an external force to the valve 1.

Specifically, the wiring error of the electric motor and the rotation of the valve 1 to the opposite opening degree, which cannot be sensed with the prior art technique, can be sensed with the TCV of the present embodiment.

Second Embodiment

A second embodiment of the present invention will be described with reference to FIG. 6. In the following description of the embodiments, components, which are similar to those of the first embodiment, will be indicated by the same reference numerals.

In the second embodiment, the full open degree Θ, the valve open sensing degree θswo, the valve close sensing degree θswc, the valve open side clearance θa and the valve close side clearance θb satisfy a relationship of θb>θswc.

Now, there will be described an exemplary operation in the case where the connection between the shaft 2 and the final gear support portion 7 is damaged.

Now, it is assumed that the connection between the shaft 2 and the final gear support portion 7 is damaged in the full close position, and the final gear 3 is driven in the valve opening direction. In the full close position, the sensed result of the valve opening degree sensor 6 is the low (Lo), as indicated with the reference numeral i in FIG. 6. Then, when the final gear 3 is further rotated in the valve opening direction, the final gear 3 contacts the magnet 4 in the intermediate position between the full close position and the full open position, and the final gear 3 begins to urge and rotate the magnet 4 in the valve opening direction. At this time, the sensed result of the valve opening degree sensor 6 is the low (Lo), as indicated with the reference numeral ii in FIG. 6.

When the final gear 3 reaches the full open position, the stop lever 13 of the final gear support portion 7 hits the full open side stopper 15, and thereby the rotation of the final gear 3 is stopped at the full open position. At this time, the sensed result of the valve opening degree sensor 6 is the low (Lo), as indicated with the reference numeral iii in FIG. 6.

Now, it is assumed that the final gear 3 is driven from the full open position in the valve closing direction. At this time, the sensed result of the valve opening degree sensor 6 is the low (Lo), as indicated with the reference numeral iii in FIG. 6. Then, when the final gear 3 is further rotated in the valve closing direction, the final gear 3 contacts the magnet 4 in the intermediate position between the full close position and the full open position, and the final gear 3 begins to urge and rotate the magnet 4 in the valve closing direction. At this time, the sensed result of the valve opening degree sensor 6 is the low (Lo), as indicated with the reference numeral iv in FIG. 6.

When the final gear 3 reaches the full close position, the stop lever 13 of the final gear support portion 7 hits the full close side stopper 14, and thereby the rotation of the final gear 3 is stopped at the full close position. At this time, the sensed result of the valve opening degree sensor 6 is the low (Lo), as indicated with the reference numeral v in FIG. 6.

Furthermore, it is now assumed that the final gear 3 is driven from this full close position in the valve opening direction. In such a case, the final gear 3 contacts the magnet 4 in the intermediate position between the full open position and the full close position. At this time, the sensed result of the valve opening degree sensor 6 is the low (Lo), as indicated with the reference numeral vi in FIG. 6. Then, the final gear 3 urges and rotates the magnet 4 in the valve opening direction.

Figure 6:
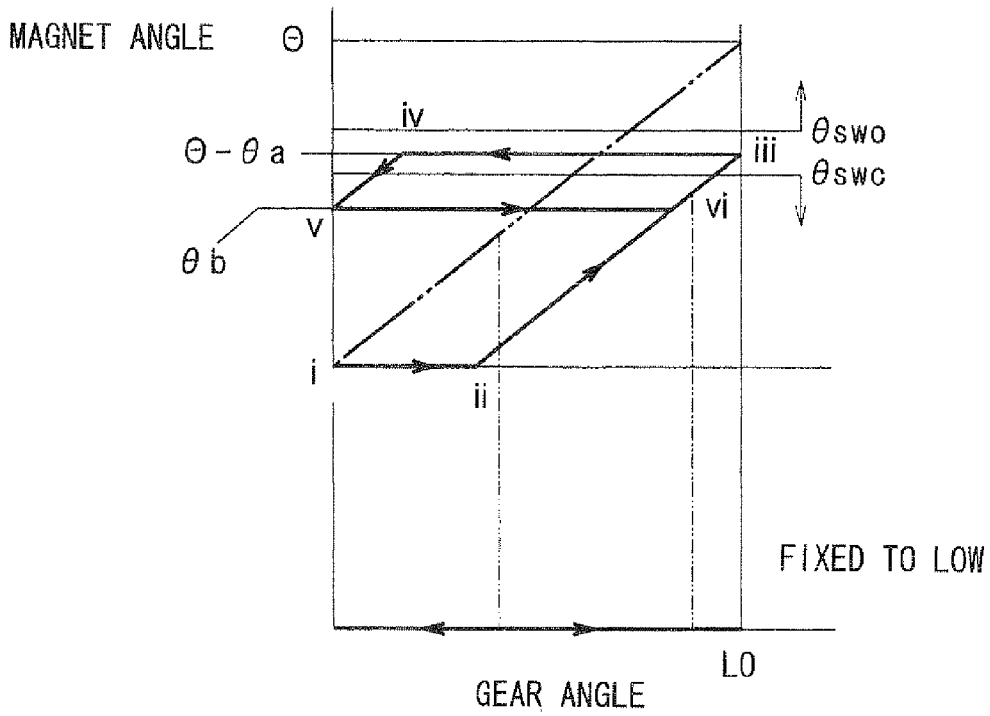
FIG. 6 is a diagram showing a magnet angle and a sensor output relative to an angle of the final gear in the state where the connection between the shaft and the final gear support portion is damaged according to a second embodiment of the present invention.

Thereafter, the stop lever 13 of the final gear support portion 7 hits the full open side stopper 15, and thereby the rotation of the final gear 3 is stopped at the full open position (see the point indicated with the reference numeral iii in FIG. 6).

In the TCV of the second embodiment, the relationship of θb>θswc is satisfied. Thereby, in the case where the connection between the shaft 2 and the final gear support portion 7 is damaged, once the output of the valve opening degree sensor 6 becomes the low (Lo), the output of the valve opening degree sensor 6 is not changed from the low (Lo) to the high (Hi).

Therefore, the ECU 100 (the program implementing the function of the failure determining means) determines the occurrence of the failure of the valve 1 in the case where the change in the open/close state of the valve 1 cannot be sensed even when the final gear 3 is repeatedly driven between the full close position and the full open position.

As discussed above, the advantage similar to that of the first embodiment can be achieved in the second embodiment.

Third Embodiment

Figure 7A:
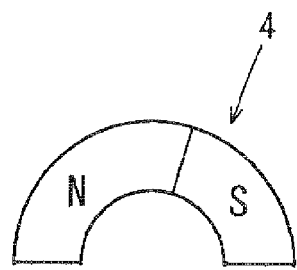
FIG. 7A is an axial view of the magnet according to a third embodiment of the present invention.
Figure 7C:
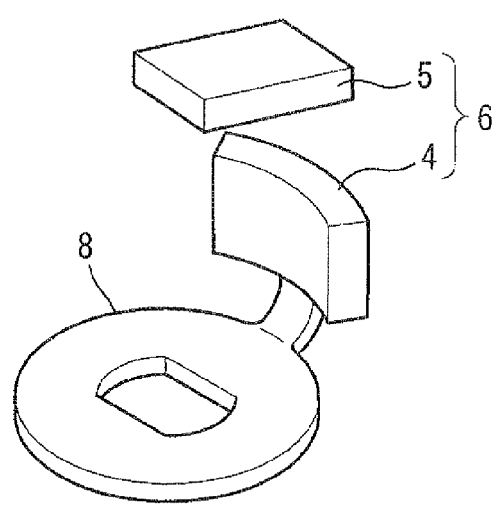
FIG. 7C is a perspective view showing the magnet, a magnet support portion and a magnetic sensing device of the third embodiment.
Figure 7B:
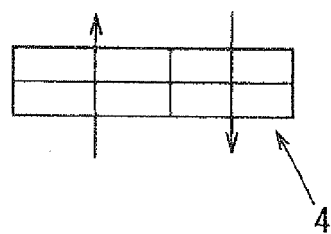
FIG. 7B is a side view of the magnet taken from a rotational center side of the magnet of FIG. 7A.

A third embodiment of the present invention will be described with reference to FIGS. 7A and 7C.

In the third embodiment, a polarity change portion (boundary), at which the polarity is changed from the N-pole to the S-pole or vice versa, is provided in the middle the magnet 4 in the rotational direction (circumferential direction).

When the polarity change portion is provided in the middle of the magnet 4 in the rotational direction (circumferential direction), the output of the Hall IC 5 can be reversed at the polarity change portion.

In this way, depending on the location of the polarity change portion, the valve open sensing degree θswo and the valve close sensing degree θswc can be set.

Fourth Embodiment

A fourth embodiment of the present invention will be described with reference to FIG. 8.

Figure 8:
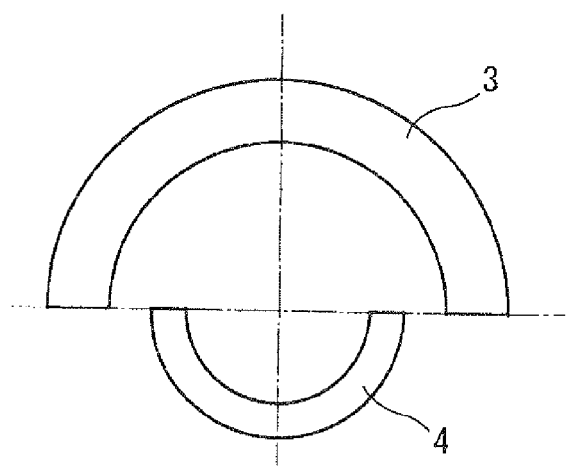
FIG. 8 is a schematic axial view showing a positional relationship between the final gear and the magnet according to a fourth embodiment of the present invention.

In the fourth embodiment, as shown in FIG. 8, the diameter (or the radial extent) of the final gear 3 and the diameter (or the radial extent) of the magnet 4 are different from each other, so that even when the final gear 3 is rotated upon the occurrence of the damage at the connection between the shaft 2 and the final gear support portion 7, the final gear 3 does not contact the magnet 4 in the rotational direction.

Specifically, unlike the above embodiments where the relationship of θa>Θ-θswo or the relationship of θb>θswc is satisfied, the value of θa and the value of θb are set to be ∞ (infinite) in the fourth embodiment.

Therefore, in the case where the connection between the shaft 2 and the final gear support portion 7 is damaged, the location of the magnet 4 is not changed even when the final gear 3 is driven to any location. Therefore, the output of the valve opening degree sensor 6 is kept constant, i.e., is kept to the high (Hi) or the low (Lo), so that the advantage similar to that of the first embodiment can be achieved.

Fifth Embodiment

A fifth embodiment of the present invention will be described with reference to FIG. 9.

Figure 9:
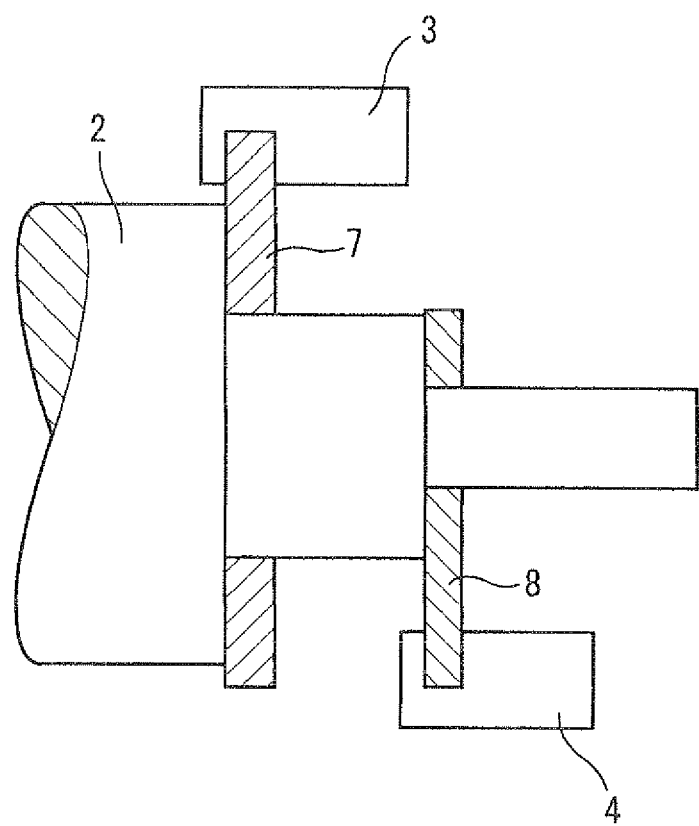
FIG. 9 is a schematic longitudinal view taken in a direction perpendicular to the axial direction showing a positional relationship between the final gear and the magnet according to a fifth embodiment of the present invention.
Figure 10A:
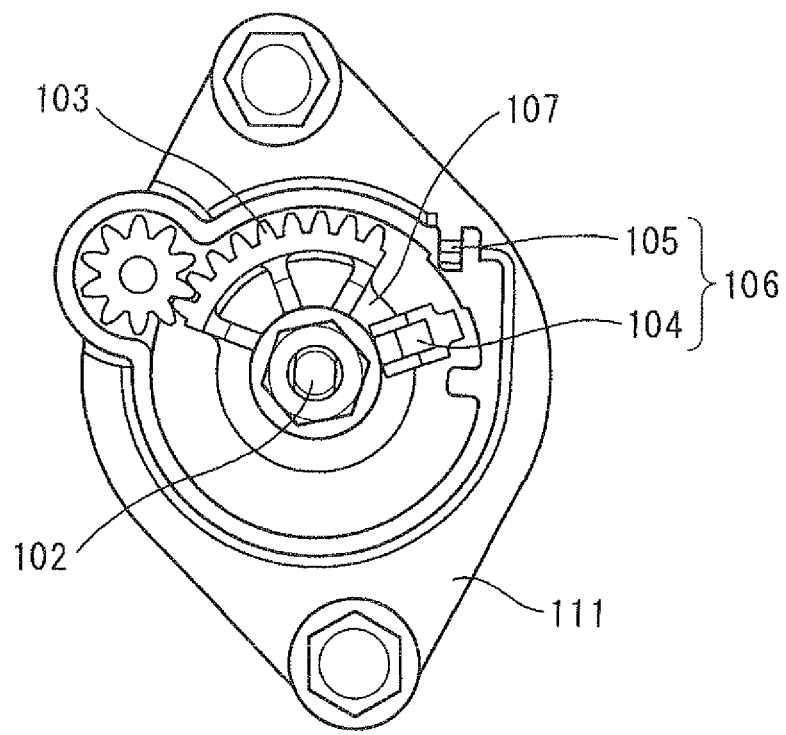
FIG. 10A is an axial view showing components of a valve drive apparatus of a prior art.
Figure 10B:
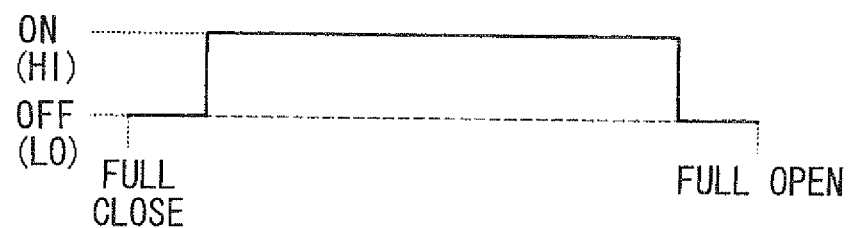
FIG. 10B is a diagram showing a sensor output relative to an angle of a final gear in the valve drive apparatus shown in FIG. 10A.

In the fifth embodiment, as shown in FIG. 9, the axial location of the final gear 3 and the axial location of the magnet 4 are different from each other, so that even when the final gear 3 is rotated upon the occurrence of the damage at the connection between the shaft 2 and the final gear support portion 7, the final gear 3 does not contact the magnet 4 in the rotational direction.

Specifically, unlike the first to third embodiments where the relationship of $\theta a > \Theta - \theta swo$ or the relationship of $\theta b > \theta swc$ is satisfied, the value of $\theta a$ and the value of $\theta b$ are set to be $\infty$ (infinite) in the fifth embodiment.

Therefore, in the case where the connection between the shaft 2 and the final gear support portion 7 is damaged, the location of the magnet 4 is not changed even when the final gear 3 is driven to any location. Therefore, the output of the valve opening degree sensor 6 is kept constant, i.e., is kept to the high (Hi) or the low (Lo), so that the advantage similar to that of the first embodiment can be achieved.

Now, modifications of the above embodiments will be described.

In the above embodiments, the Hall IC 5 is used as the magnetic sensing device. Alternatively, any other magnetic device (any other magnetic sensing means) can be used as the magnetic sensing device of the present invention.

In the above embodiments, the resin magnet is used as the magnet 4. Alternatively, any other magnet, such as a ferrite magnet or a rare-earth magnet, may be used as the magnet of the present invention.

In the above embodiments, the final gear support portion 7 is provided as the separate member, which is provided separately from the final gear 3. Alternatively, the final gear support portion 7 may be integrated with the final gear 3 as a single piece component.

In the above embodiments, the magnet support portion 8 is provided as the separate member, which is provided separately from the magnet 4. Alternatively, the magnet support portion 8 may be integrated with the magnet 4.

In the above embodiments, the double-sided portion 16 is used as the connection between the final gear support portion 7 and the shaft 2 and the connection between the magnet support portion 8 and the shaft 2. However, the double-sided portion 16 is used to merely illustrate the example of the fitting structure, which fits between the final gear support portion 7 and the shaft 2 and between the magnet support portion 8 and the shaft 2, and this fitting structure may be modified in any appropriate manner.

In the above embodiments, the present invention is applied to the TCV. Alternatively, the present invention may be applied to any other intake air control apparatus, such as a swirl control valve.

In the above embodiments, the present invention is applied to the TCV. Alternatively, the present invention may be applied to an exhaust gas control apparatus, which is provided in an exhaust passage of the engine.

In the above embodiments, the present invention is applied to the TCV. Alternatively, the present invention may be applied to a drive apparatus of a valve in a technical filed that is not related to the intake/exhaust of the engine.

Additional advantages and modifications will readily occur to those skilled in the art. The invention in its broader terms is therefore not limited to the specific details, representative apparatus, and illustrative examples shown and described.

What is claimed is:

1. A valve drive apparatus comprising:
a shaft that rotates integrally with a valve;
an electric motor that generates a rotational torque upon energization of the electric motor;
a speed reducing mechanism that includes a final gear, which applies the rotational torque to the shaft; and
a valve opening degree sensor that includes:
  a magnet that is rotated integrally with the shaft; and
  a magnetic sensing device that is provided to a stationary member and senses a change in a magnetic flux supplied from the magnet, wherein:
a sensed result of the valve opening degree sensor is changeable between high and low;
the valve opening degree sensor senses a change in the valve opening degree from a valve close side to a valve open side when the sensed result indicates one of a change from the low to the high and a change from the high to the low only at a valve open sensing degree that is passed at time of rotating the valve from a full close degree to a full open degree of the valve;
the valve opening degree sensor senses a change in the valve opening degree from the valve open side to the valve close side when the sensed result indicates the other one of the change from the low to the high and the change from the high to the low only at a valve close sensing degree that is passed at time of rotating the valve from the full open degree to the full close degree of the valve;
the final gear and the magnet are separately joined to the shaft;
the valve drive apparatus includes a means for limiting a rotational range of the final gear between a full open position and a full close position;
a positional relationship between the final gear and the magnet is set such that the final gear and the magnet contact with each other in a rotational direction when the final gear is rotated in a state where a connection between the shaft and a final gear support portion, through which the final gear is installed to the shaft, is damaged;
the final gear and the magnet are arranged to satisfy at least one of $\theta a > \Theta - \theta swo$ and $\theta b > \theta swc$, where:
$\theta a$ denotes a valve open side clearance that is a circumferential gap angle circumferentially measured between the magnet and an open side end part of the final gear, which is an end part of the final gear in a valve opening direction;
$\theta b$ denotes a valve close side clearance that is a circumferential gap angle circumferentially measured between the magnet and a close side end part of the final gear, which is an end part of the final gear in a valve closing direction;
$\Theta$ denotes the full open degree;
$\theta swo$ denotes the valve open sensing degree; and
$\theta swc$ denotes the valve close sensing degree; and
the valve drive apparatus includes a means for determining a failure of the valve in a case where a change in an open/close state of the valve is not sensed with the valve opening degree sensor at time of driving the final gear from the valve close side to the valve open side or from the valve open side to the valve close side.

2. The valve drive apparatus according to claim 1, wherein the determining means determines the failure of the valve in at least one of the following conditions:
- the sensed result of the valve opening degree sensor indicates the valve open state of the valve in a state where the valve is supposed to be in a valve close position; and
- the sensed result of the valve opening degree sensor indicates the valve close state of the valve in a state where the valve is supposed to be in a valve open position.

3. The valve drive apparatus according to claim 1, wherein:
- the final gear is joined to the shaft through the final gear support portion, which is formed integrally with or separately from the final gear; and
- the magnet is joined to the shaft through a magnet support portion, which is formed integrally with or separately from the magnet.

4. The valve drive apparatus according to claim 3, wherein:
- the final gear is made of a resin material;
- the final gear support portion is formed separately from the final gear and is made of a metal material;
- a portion of the final gear support portion, which is made of the metal material, is insert-molded with the final gear, which is made of the resin material, to integrate the final gear and the final gear support portion together;
- the magnet is made of a resin material;
- the magnet support portion is formed separately from the magnet and is made of a metal material and; and
- a portion of the magnet support portion, which is made of the metal material, is insert-molded in the magnet, which is made of the resin material, to integrate the magnet and the magnet support portion together.

5. A valve drive apparatus comprising:
- a shaft that rotates integrally with a valve;
- an electric motor that generates a rotational torque upon energization of the electric motor;
- a speed reducing mechanism that includes a final gear, which applies the rotational torque to the shaft; and
- a valve opening degree sensor that includes:
    - a magnet that is rotated integrally with the shaft; and
    - a magnetic sensing device that is provided to a stationary member and senses a change in a magnetic flux supplied from the magnet, wherein:
- a sensed result of the valve opening degree sensor is changeable between high and low;
- the valve opening degree sensor senses a change in the valve opening degree from a valve close side to a valve open side when the sensed result indicates one of a change from the low to the high and a change from the high to the low only at a valve open sensing degree that is passed at time of rotating the valve from a full close degree to a full open degree of the valve;
- the valve opening degree sensor senses a change in the valve opening degree from the valve open side to the valve close side when the sensed result indicates the other one of the change from the low to the high and the change from the high to the low only at a valve close sensing degree that is passed at time of rotating the valve from the full open degree to the full close degree of the valve;
- the final gear and the magnet are separately joined to the shaft;
- a positional relationship between the final gear and the magnet is set such that the final gear and the magnet does not contact with each other in a rotational direction even when the final gear is rotated in a state where a connection between the shaft and a final gear support portion, through which the final gear is installed to the shaft, is damaged;
- the valve drive apparatus includes a means for determining a failure of the valve in a case where a change in an open/close state of the valve is not sensed with the valve opening degree sensor at time of driving the final gear from the valve close side to the valve open side or from the valve open side to the valve close side;
- the final gear is joined to the shaft through the final gear support portion, which is formed integrally with or separately from the final gear;
- the magnet is joined to the shaft through a magnet support portion, which is formed integrally with or separately from the magnet;
- the final gear is made of a resin material;
- the final gear support portion is formed separately from the final gear and is made of a metal material;
- a portion of the final gear support portion, which is made of the metal material, is insert-molded with the final gear, which is made of the resin material, to integrate the final gear and the final gear support portion together;
- the magnet is made of a resin material;
- the magnet support portion is formed separately from the magnet and is made of a metal material and; and
- a portion of the magnet support portion, which is made of the metal material, is insert-molded in the magnet, which is made of the resin material, to integrate the magnet and the magnet support portion together.

6. The valve drive apparatus according to claim 5, wherein the determining means determines the failure of the valve in at least one of the following conditions:
- the sensed result of the valve opening degree sensor indicates the valve open state of the valve in a state where the valve is supposed to be in a valve close position; and
- the sensed result of the valve opening degree sensor indicates the valve close state of the valve in a state where the valve is supposed to be in a valve open position.

* * * * *